INVENTORS.
Francis L. Burkett
Richard J. Lee

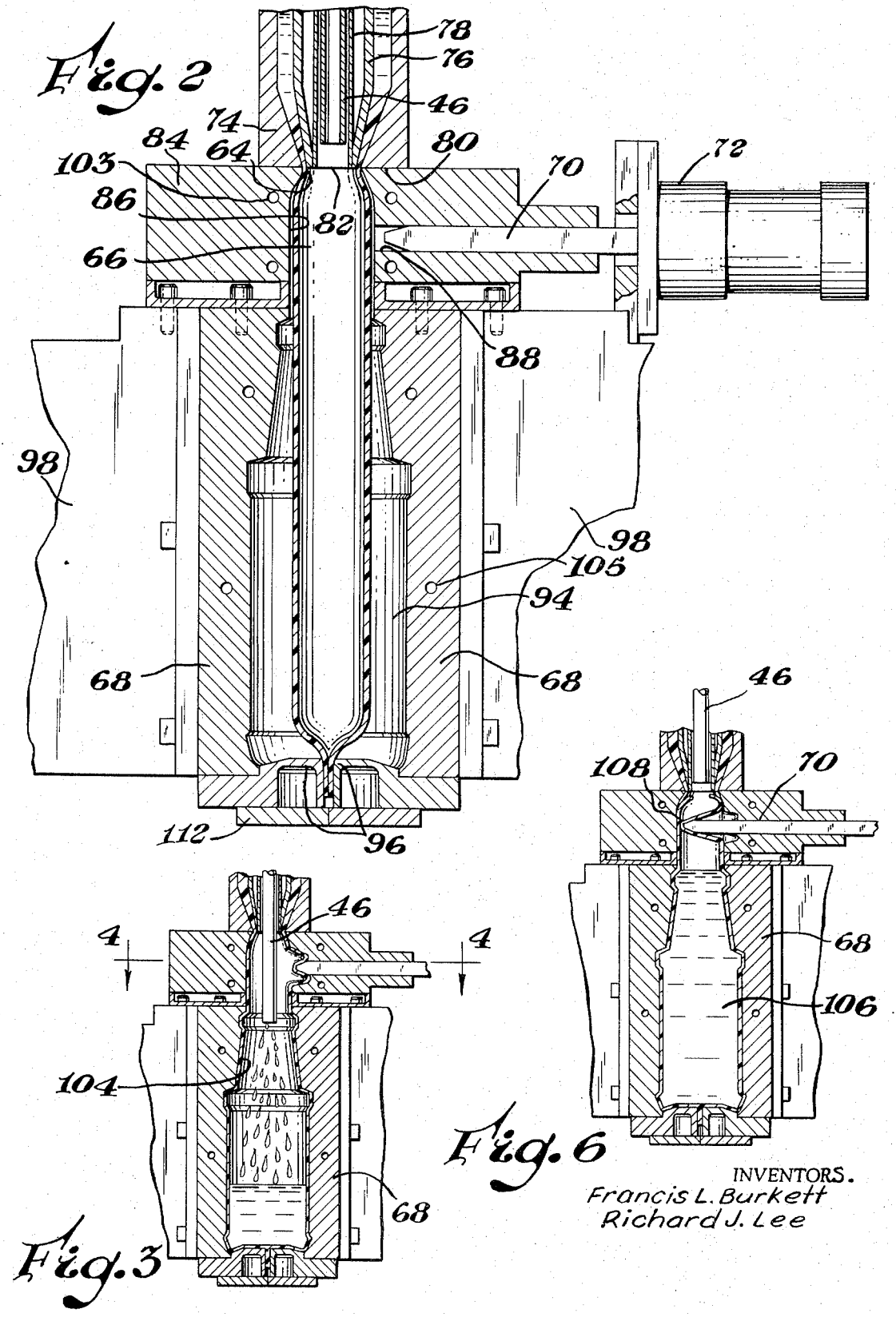

INVENTORS.
Francis L. Burkett
Richard J. Lee

United States Patent Office 3,792,144
Patented Feb. 12, 1974

3,792,144
PACKAGING PROCESS
Francis L. Burkett and Richard J. Lee, Breckenridge, Mich., assignors to The Dow Chemical Company, Midland, Mich.
Original application Oct. 3, 1968, Ser. No. 581,931, now Patent No. 3,464,085, dated Sept. 2, 1969. Divided and this application Feb. 5, 1969, Ser. No. 816,444
Int. Cl. B29c 17/07
U.S. Cl. 264—96                                        4 Claims

ABSTRACT OF THE DISCLOSURE

Method for blow molding thermoplastic containers, filling the same with a sterile product immediately upon their formation while the containers are yet in a sterile condition and sealing the filled containers while they still remain sterile. All of the steps are performed while exposing the interior of a parison and the container formed therefrom only to a sterile atmosphere.

DISCLOSURE

This application is a division of application Ser. No. 581,931, filed Sept. 26, 1966, now U.S. Pat. No. 3,464,085.

This invention relates to a method of packaging and preserving products over a particularly long period of time, and preferably is directed to a method for aseptically forming, filling and sealing containers in a closed system. One such operation to which the present invention can have particular application is in the aseptic packaging of milk. Presently, milk is most usually packaged in glass, or plastic bottles and paper/plastic cartons which are not fully sterile before their filling and, if they are returnable, upon their return to the dairy are only washed before their reuse. Because such packages are not completely sterile they require refrigeration and have a relatively short shelf life.

The above and other obvious disadvantages of prior art milk containers, and corresponding containers for other products where sterilization is necessary or desirable, are overcome by the present invention. This invention provides an inexpensive container which can be fabricated at low cost and can be filled and sealed immediately upon its formation so as to avoid sterilization problems. Briefly, the present invention comprises blow molding thermoplastic containers, filling the containers with milk or other sterile product immediately upon their formation and while yet in a sterile condition, and sealing the filled containers while they still remain sterile. Thus, a sterilized product can be packaged without requiring separate sterilization of the container receiving the product. This results in an inexpensive package which has the outstanding advantage of being able to maintain the product therein in a saleable condition for especially long periods of time, even without refrigeration.

These and other advantages will be apparent from the drawing wherein briefly:

FIG. 2 is an enlarged fragmentary detail, partially cross-sectioned, elevational view of the extrusion and blow molding apparatus of FIG. 1, illustrating a subsequent step in the forming of the container;

FIG. 3 is a view like FIG. 2 only reduced in size and showing a still subsequent step in the formation of the container as well as the filling operation;

FIG. 6 is a view like FIG. 3 showing the configuration of the container after it is filled and sealed;

Figure 1:
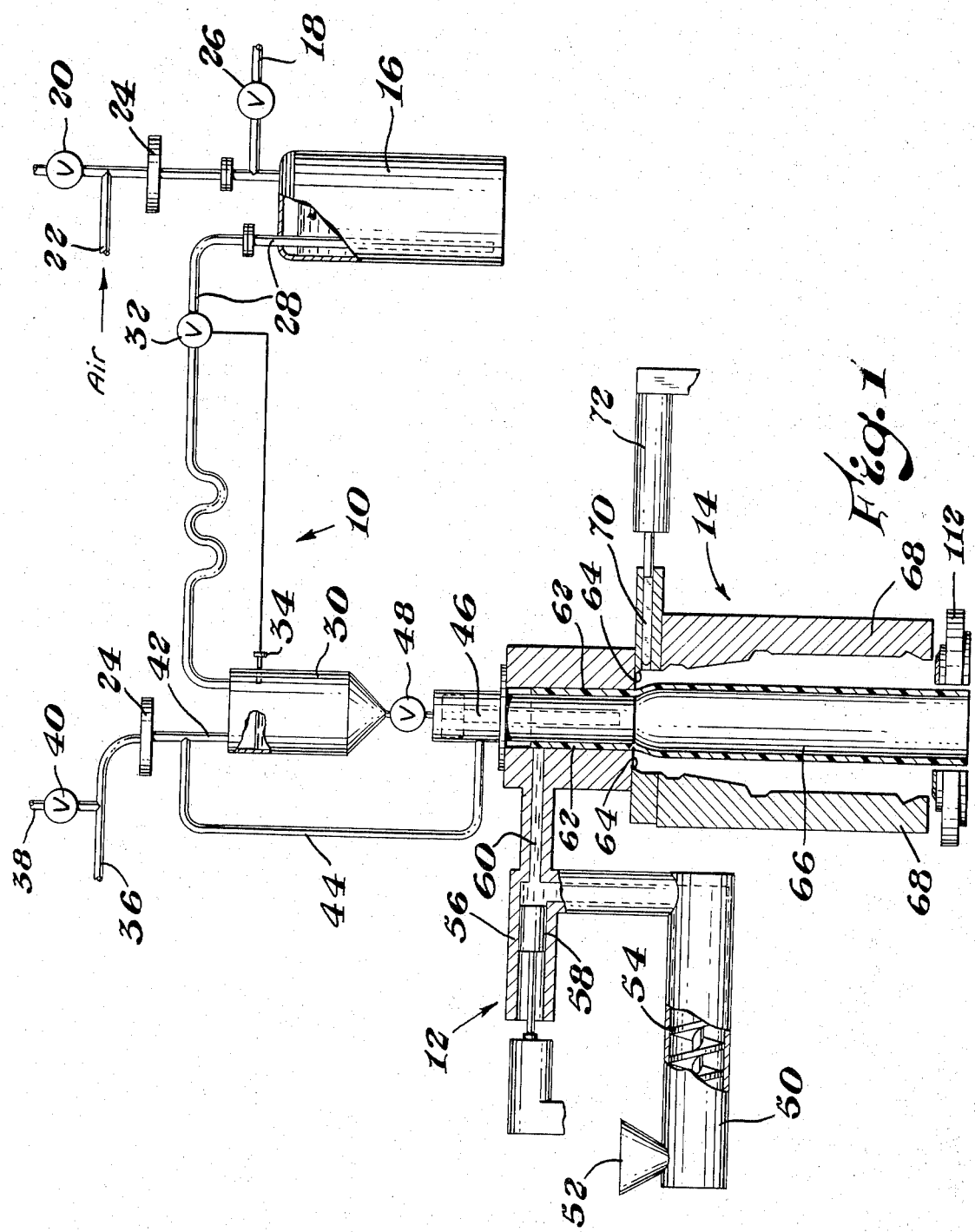
FIG. 1 is a generally schematic view showing a preferred combination of apparatus for carrying out the invention, portions thereof being in cross section and fragmentary portions thereof being broken away.

The arrangement of FIG. 1 illustrates a preferred overall combination of apparatus for performing the method of the present invention and comprises, basically, milk supply and handling apparatus 10, extruding apparatus 12, and blow molding and filling apparatus 14. In this system a sterilized milk product is supplied in various quantities through the apparatus 10 while the plastic for forming the bottles is supplied through the apparatus 12. The plastic and milk bottles are combined in the blow molding and filling apparatus 14 which effects a sterile filled container of milk in a completely closed system.

The apparatus 10 includes a product (in this instance milk) supply tank 16 which receives through inlet 18 elements for cleaning and sterilizing the product supply tank. Valve 20 controls the entry of steam for sterilizing while inlet 22 permits air to displace the fluid which is removed from the product supply tank 16. The air which comes in through inlet 22 passes through a filter 24 so that it is sterile when it enters the fluid supply tank 16. Sterilized milk enters the system through valve 26 and fills the tank 16 with the necessary quantities of milk. The milk travels upwardly through the pipe 28 to a volumetric filling tank 30 which is adapted to contain the exact quantity of fluid necessary to fill one milk container. When the valve 32 is opened, milk from the tank 16 is permitted to pass through pipe 28 and through the tank 30 until the milk level reaches the level control 34. Through conventional electrical controls, the valve 32 is closed when the level control indicator 34 is actuated by its contact with the milk. The main purpose of apparatus 10 is to supply a sterilized product to the system. Other apparatus than that specifically described above which can effect the same end result can be employed for the purposes of this invention.

Atmosphere for blowing the bottles enters through inlet 36 and steam for sterilizing enters through the inlet 38 which is controlled by the valve 40, but the steam and the atmosphere pass through admitting filter 24 before entering the system. The steam, however, is only used for initial sterilization of the system. The blowing atmosphere (air) which enters through inlet 36 is controlled for both high and low pressure supply, as may be required, by conventional machine circuity not here shown. Air and sterilized steam pass through extension 42 into the filling tank 30 to sterilize the filling tank and displace the fluid that is removed. The rest of the air travels through pipe 44 to be used for blow molding the container during container fabrication, as will be apparent hereinafter.

The sterile milk is permitted to enter into combination with the container through a fill tube 46, which tube can be raised and lowered by a conventional mechanism not here shown. A dumping valve 48 is actuated to permit the milk to pass through a fill tube 46, which quantity of milk is exactly measured from the filling tank 30, as described hereinbefore.

The extruder 50 receives polymeric resin, such as bottle grade polyethylene or other suitable material, through the hopper 52. A screw 54 feeds the resin to a piston operated accumulator 56. When the exact quantity of polymeric resin for one parison is in the accumulator 56, the piston 58 is actuated. This exact measured quantity of resin passes through the channel 60 along path 62 and outwardly through the die opening 64 to form an extended parison 66 which thereafter is blown into a container for the milk. The parison 66 is surrounded by blow molding die halves 68 which, together with the halves of ejector 112, conform to the outside configuration of the bottle. A sealing bar 70, hydraulically actuated by elements 72 is located adjacent the upper end of the die mold halves 68 to actuate the seal in a manner described hereinafter in some detail.

Sealing bar 70, and its operating mechanism, as well as some of the extruder and blow molding die details are illustrated most clearly in FIG. 2. Extruder die head 74 includes a hollow mandrel 76, the lowermost extent of which defines a converging die orifice 64 for extruding parison 66, as earlier described. Interiorly of mandrel 76 is a second tubular mandrel 78 to which blow-air is transmitted interiorly of the parison, second mandrel 78 being connected to air tube 44 to accomplish this purpose. Located interiorly of second mandrel 78 is fill tube 46 which is adapted to travel upwardly and downwardly within second mandrel 78 to a position above and below the face 80 of extruder die 74. A peripheral opening 82 in the face 80 permits such travel. This travel of the fill tube can be accomplished by a conventional hydraulic mechanism not here shown. Die head 84 is located immediately below extruder die 74 and contains an aperture 86 of a diameter sufficient to receive the parison 66 after it is extruded through the die orifice 64, the opening 86 being wider than the die orifice 64 to compensate for diameter swell typical in most polymeric extrusions.

Die halves 68 and the halves of ejector 112 include a cavity 94 defining the outer dimensions of the container to be blow molded. Ejector 112 includes mating jaws 96 which clamp together and seal the bottom of the parison when the mold halves 68 are closed, and while the parison is still hot and thus in a sterile state. Mold halves 68 are actuated through plates 98 by any conventional means, not here shown. Likewise, the halves of ejector 112 are also actuated by a conventional means not here shown.

A channel 88 extends from one end of die head 84 through the die to aperture 86, and is of a sufficient height and width to receive sealing bar 70. Also included within die head 84, are cavities (not shown) to receive sealing slides 90 (shown in FIG. 4). These last mentioned cavities are similar to the cavities 88 but are to the fore and aft sides (rather than right or left sides) of the slide 70 as one views the apparatus of FIG. 2, and as illustrated schematically in FIG. 4, which cooperate with sealing bar 70 to form the seal according to the teachings of this invention, which will be described in detail hereinafter. An actuating means 72, such as a pneumatic cylinder, is used to move the sealing bar along the channel 88. The sealing slides 90 move in and out, the in position being shown in FIG. 4, the slides 90 movable out in the direction indicated by the arrows in FIG. 4. The sealing bar 70 likewise moves in and out, the in position being shown in FIG. 4, the sealing bar 70 movable out as indicated by its representative arrow. The edge 100 of the sealing bar 70 is shown tapered at an angle so that it mates with the edge 102 of the sealing slides 90 at an angle of about 45° when the sealing slides 90 are at their innermost position. Ports 103 are included in die head 84, permitting heated fluid to pass therethrough so that the top of the parison can be kept at a forming temperature for sealing. Ports 103 can also carry a cooling medium to quicken cooling of the top when desired. Conventional cooling of the bottle body by a cooling medium flowing through ports 105 in die halves 68 can be provided.

Figure 4:
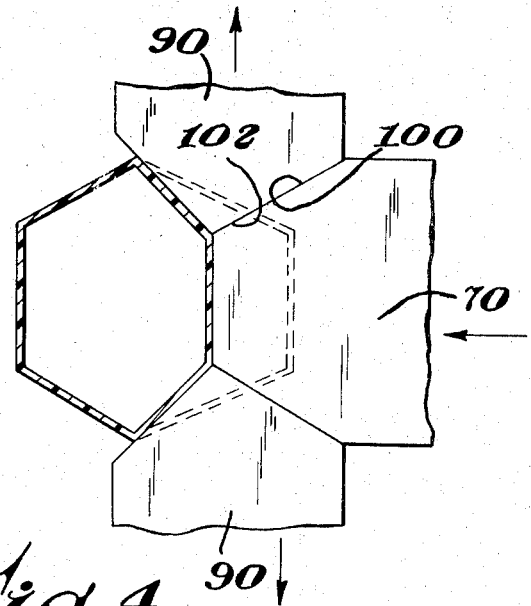
FIG. 4 is a greatly enlarged view taken along the line 4—4 of FIG. 3, showing a preferred sealing mechanism of this invention in its first stage of operation.

Employing the apparatus of the present invention, as seen through the sequence of FIGS. 1–8, the operation of the present invention proceeds as follows:

1. At the start of a given cycle the die halves 68 are in their open position, the sealing bar 70 and sealing slides 90 are in their retracted position and a parison 66 is extruded through the die orifice 64, all as illustrated in FIG. 1;

2. The die halves 68 and halves of ejector 112 are then closed, the die jaws 96 sealing the bottom of parison 66 while still in its hot sterile state and, with the sealing bar 70 remaining in a retracted position, the sealing slides 90 are advanced, all as illustrated in FIGS. 2 and 4.

3. The parison 66 is then blown to the outer configuration of the cavity 94 by air entering through the second (interior) mandrel 78 to the shape of the container 104, as illustrated in FIG. 3.

4. The fill tube 46 is lowered (either simultaneously with or after blowing) through the cavity 86 into the mouth of the bottle 104 and the bottle is filled with the milk or other liquid of an amount sufficient to fill the container 104 just formed. The milk has entered the container in a sterile condition. The container will be partially cooled by the milk since it will usually be at about room temperature while the forming temperature, in the case of polyethylene, for example, can be about 350° F. to 400° F. This cooling effect accelerates the setting of the resin so that the cycle can proceed more quickly than if the container were not immediately filled. The high temperature of the resin makes it sterile as the sterile milk is introduced into the container. Thus, since the system is closed, complete aseptic filling is achieved. Furthermore, the pressure of the filling fluid keeps the bottle from shrinking upon cooling and prevents any possibility of crystallization of the resin. This complete stage of the operation is illustrated in FIG. 3.

Figure 5:
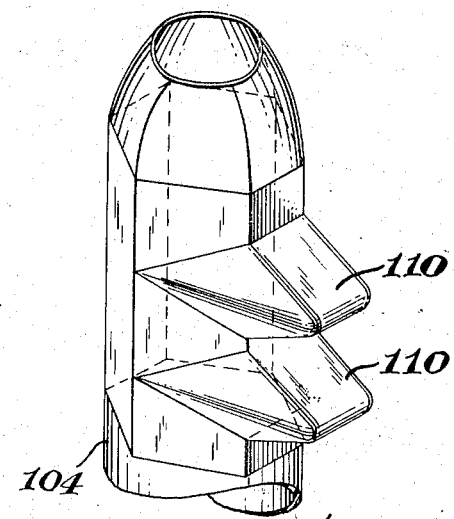
FIG. 5 is a partial isometric view of a parison as formed by the apparatus of the present invention at the stage shown in FIG. 4.
Figure 7:
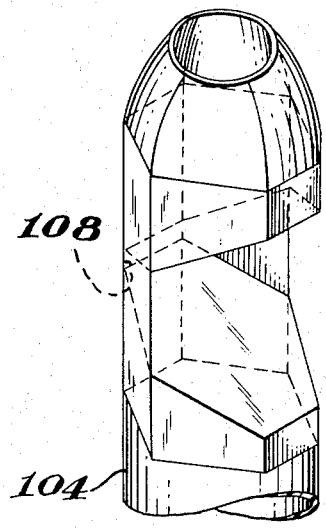
FIG. 7 is a view like FIG. 5 only showing the top of the parison forming the container after it is completely sealed.

4. The form of the parison 66 extending above the top of the bottle 104, when located in die head 84 and at the stage contemplated by FIGS. 3 and 4, is illustrated in FIG. 5. This configuration is formed because of the advance position of the sealing slides 90 and the retracted position of the sealing bar 70. When a bottle 104 has been formed and filled to the proper level with milk 106, the sealing thereof is next achieved. To accomplish this, the fill tube 46 is retracted, the sealing slides 90 are retracted and the sealing bar 70 is advanced so that the side of the parison it engages is pushed entirely over to and in contact with the opposite side of the parison to form a heat seal across the top of the parison along the mating surfaces of the jointure 108, as illustrated in FIGS. 6 and 7 (FIG. 7 being a view like FIG. 5 only with the parison being entirely sealed). It is noted that the first forming of the nobs 110 of FIG. 5 permits the unfolding of the parison sealing area to accomplish the seal 108 in a manner which does not cause an undue stretching and thinning of the parison wall at the location of the seal. It is noted that the nobs 110 are formed and folded back before cooling takes place. If this forming and folding back were not accomplished while the polymer was still warm in the top seal area of the parison, the resin would not have stretched evenly and ruptures could be expected.

Figure 8:
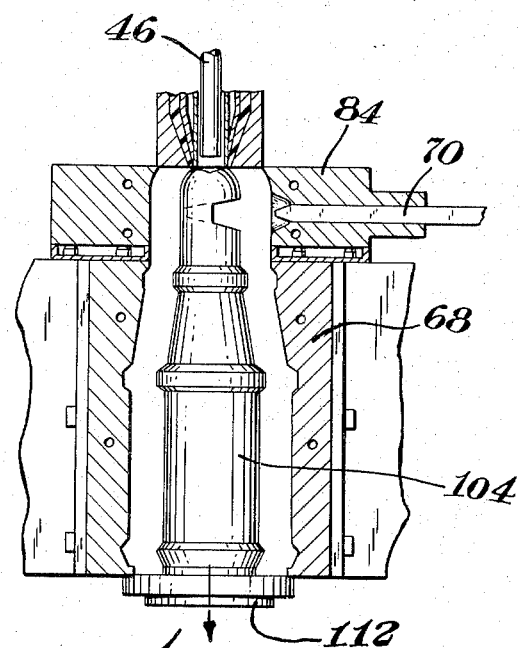
FIG. 8 is a view like FIG. 6 with the dies open and the filled container ready to be removed.

5. When the bottle has been sufficiently cooled the mold die halves 68 are opened and the filled container 104 is ejected or removed by any convenient mechanism, such as by ejector 112, as shown in FIG. 8.

Figure 9:
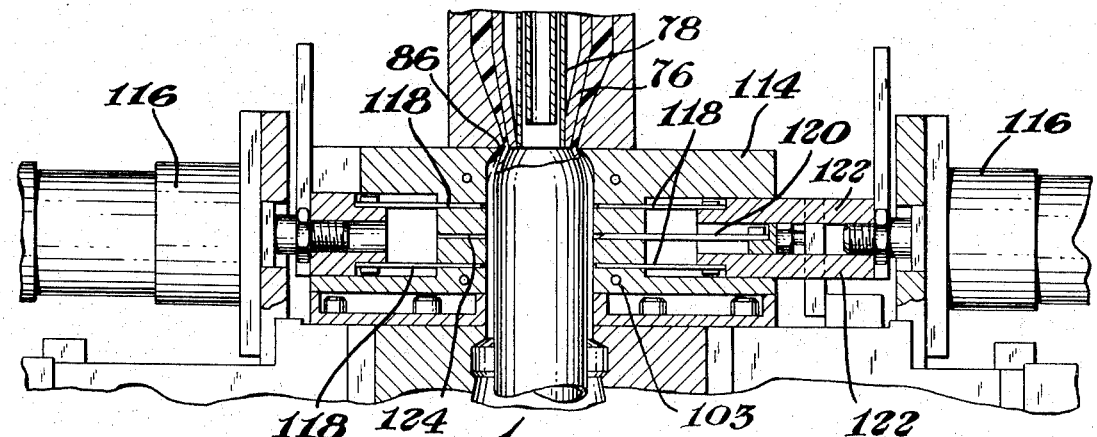
FIG. 9 is a fragmentary cross sectional view like FIG. 2 only showing a modified form of the invention.
Figure 10:
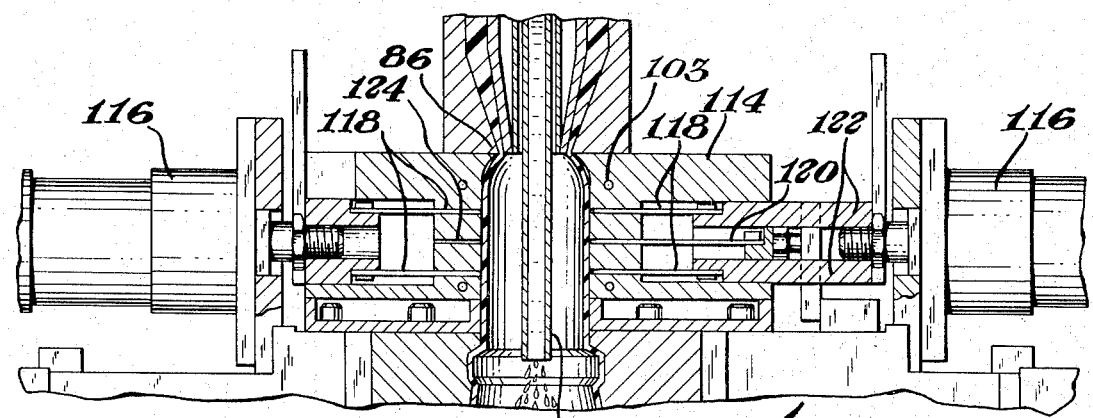
FIG. 10 is a view like FIG. 9 showing a subsequent step in the operation of the modified apparatus.
Figure 11:
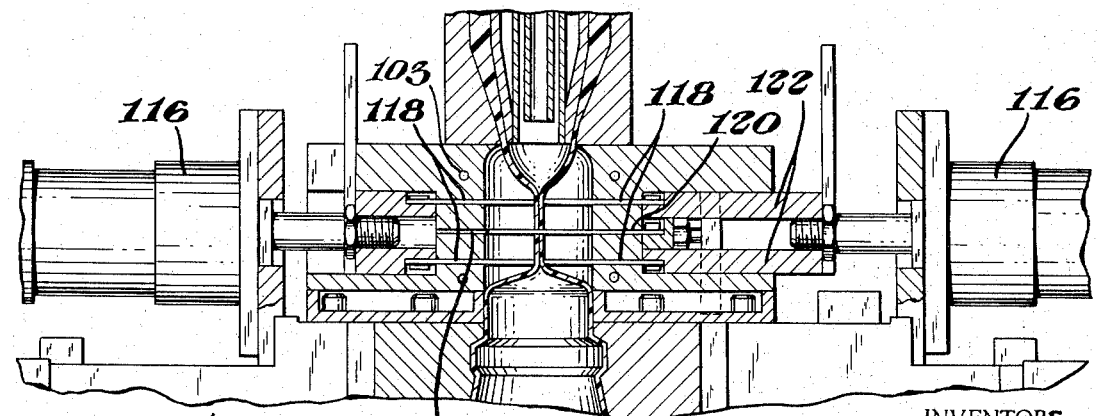
FIG. 11 is a view like FIG. 10 only showing the next step in the operation of the modified apparatus.

The modified form of the sealing mechanism of the present invention is illustrated in its operative embodiment by the sequence of FIGS. 9 through 11. Parts of the modified apparatus which are substantially identical to those earlier described, with respect to the embodiment of FIGS. 1 through 8, and those portions not shown, are like those illustrated in FIGS. 1 through 8 and bear the same reference characters wheresoever possible. The difference lies in the modified die head 114. Located within die head 114 and operated by typical pneumatic mechanism 116, are sealing bars 118 and a knife 120. Sealing bars 118 are located on the opposite sides of the parison 66 and are attached to and slide by way of carriage 122 to a position at about the center of the parison to pinch the outside walls of the parison together. That is, the advanced position of the sealing bars 118 brings them within a distance of one another which is about equal to or barely less than the thickness of the side wall of parison 66, the advanced position being illustrated in FIG. 11. Knife 120 is of a width greater than the diameter of the parison 66 and located so as to engage fully the diameter of the parison 66 as the knife travels across the opening 86 into a cooperating slot 124 to accomplish complete severing of the pinched together walls of the parison.

Thus, in sequence, the parison 66 is extruded through the opening 86 of the die head 114 with the sealing bars 118 and knife 120 in their retracted position. The parison is then blown and the fill tube 46 is lowered, and the container 104 is filled, all as illustrated in FIG. 10 (alternatively, filling can occur while blowing takes place). Then the fill tube 46 is raised, the sealing bars 118 are closed and the knife 120 severs the parison as illustrated in FIG. 11. Thereafter the die mold halves 68 are opened, the sealing bars 118 and knife 120 are retracted and the bottle is ejected (not shown).

It is obvious from the present invention that certain other modifications can be made therein, particularly with respect to the sealing mechanism of the apparatus. Accordingly, it will be apparent to those skilled in the art that various changes can be made therein without departing from the spirit and scope of the invention. For example, sterile air under positive pressure can flow through the end of the first parison, and subsequent parisons where desirable or necessary, to guarantee the sterility of each bottle.

Accordingly, what is claimed as new is:

1. A method of aseptically forming, filling and sealing plastic containers with a sterile product comprising the steps of extruding a hot sterile hollow elongated parison, pinching one end of said parison closed while still at a sterile temperature, injecting pressurized fluid into said parison at its other end to expand the parison to a desired container configuration, introducing said sterile product into said parison, and sealing the other end of said parison by first effecting nodular spaced projections of one side of the parison wall in a direction opposite to the other side thereof and, after the container is filled with said sterile product, bringing the part of said one side of the parison wall between said projections towards and into sealed engagement with said other side of the parison wall, the projections unfolding as the two sides are brought together, all preceding steps being performed while exposing the interior of the closed parison and container formed therefrom only to a sterile atmosphere, then severing the formed and filled container from the rest of the extrudate and removing the formed and filled container without thereby exposing the contents of the container to other than a sterile environment.

2. The method of claim 1 wherein sterile fluid under positive pressure is flushed through the end of the parison to maintain a sterile environment therein.

3. The method of claim 1 wherein said sterile product is introduced into said parison while the parison is being blown.

4. The method of claim 1 wherein said sterile product is introduced into said parison after it is blown.

References Cited

UNITED STATES PATENTS

| | | | |
|---|---|---|---|
| 2,991,500 | 7/1961 | Hagen | 264—96 X |
| 3,311,949 | 4/1967 | Moran | 264—98 X |
| 3,358,062 | 12/1967 | Lemelson | 264—96 |
| 3,423,495 | 1/1969 | Bachner | 264—96 |
| 3,399,508 | 9/1968 | Frielingsdof et al. | 53—140 |

FOREIGN PATENTS

| | | | |
|---|---|---|---|
| 1,180,301 | 10/1964 | Germany | 264—98 |

ROBERT F. WHITE, Primary Examiner

J. H. SILBAUGH, Assistant Examiner

U.S. Cl. X.R.

264—98, 296; 425—Dig. 207